United States Patent
Lu et al.

(10) Patent No.: US 7,251,389 B2
(45) Date of Patent: Jul. 31, 2007

(54) EMBEDDED ON-DIE LASER SOURCE AND OPTICAL INTERCONNECT

(75) Inventors: Daoqiang Lu, Chandler, AZ (US); Bruce A. Block, Portland, OR (US); Dongming He, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/234,930

(22) Filed: Sep. 26, 2005

(65) Prior Publication Data

US 2007/0081760 A1 Apr. 12, 2007

(51) Int. Cl.
 *G02B 6/12* (2006.01)
(52) U.S. Cl. ........................................................ 385/14
(58) Field of Classification Search .................. 385/14, 385/30
 See application file for complete search history.

(56) References Cited

U.S. PATENT DOCUMENTS

| | | | |
|---|---|---|---|
| 5,276,745 A * | 1/1994 | Revelli, Jr. ................... | 385/14 |
| 6,693,736 B1 * | 2/2004 | Yoshimura et al. .......... | 359/333 |
| 6,982,996 B1 * | 1/2006 | Putnam et al. ................. | 372/6 |
| 2003/0015720 A1 | 1/2003 | Lian et al. | |
| 2004/0165812 A1* | 8/2004 | Blauvelt et al. ............... | 385/14 |
| 2005/0163459 A1 | 7/2005 | Deliwala | |
| 2005/0207464 A1* | 9/2005 | Blauvelt et al. ............... | 372/64 |
| 2005/0213889 A1* | 9/2005 | Blauvelt et al. ............... | 385/50 |

OTHER PUBLICATIONS

Kuo, Hung-Fei et al., "InP/InGaAsP MQW Thin Film Edge Emitting Lasers for Embedded Waveguide Chip to Chip Optical Interconnections," Lasers and Electro-Optics Society, 2003. LEOS 2003. The 16th Annual Meeting of the IEEE, vol. 1, Oct. 27-28, 2003, pp. 63-64.

Lo, Jeffery C.C. et al., "Modified Passive Alignment of Optical Fibers with low Viscosity Epoxy Flow Running in V-grooves," 2004 Electronic Components and Technology Conference. ECTC '04. Proceedings, vol. 1, Jun. 1-4, 2004, pp. 830-834.

Lu, Daoqiang et al., "Optical Package," U.S. Appl. No. 10/954,903, filed on Sep. 30, 2004.

Leheny, R. F., "Optoelectronic Integration: A Technology for Future Telecommunication Systems", *IEEE Circuits and Devices Magazine*, vol. 5, No. 3, May 1, 1989, pp. 38-41.

Hayashi, Izuo, "Future Technology and Market for Optoelectronics", *Lasers and Electro-Optics Society Annual Meeting Conference Proceedings*, vol. 1, Conf. 2, Oct. 17, 1989, pp. 1-5.

(Continued)

*Primary Examiner*—Michelle Connelly-Cushwa
*Assistant Examiner*—Chris H. Chu
(74) *Attorney, Agent, or Firm*—Blakely, Sokoloff, Taylor & Zafman LLP

(57) ABSTRACT

An apparatus and method for embedding a laser source on a semiconductor substrate and an optical interconnect to couple the laser source to internal components of the semiconductor substrate. An on-die waveguide is integrated on the semiconductor substrate. A package waveguide is disposed on the semiconductor substrate and evanescently coupled to the on-die waveguide. The laser source is embedded within the packaged waveguide to provide an optical signal to the on-die waveguide via the package waveguide.

21 Claims, 8 Drawing Sheets

OTHER PUBLICATIONS

WADA, Osamu, "III-V Semiconductor Integrated Optoelectronoics for Optical Computing", *SPIE*, vol. 1362, Physical Concepts of Materials for Novel Optoelectronic Device Applications II: Device Physics and applications, 1990, pp. 598-607.

Takeuchi, Hiroaki et al., "Monolithic Integrated Optical Circuit for Coherent Detection", *Electronics and Communications in Japan, Part II: Electronics*, vol. 74, No. 1, Jan. 1991, pp. 38-45.

PCT/US2006/037126, PCT International Search Report and Written Opinion, Jan. 22, 2007.

* cited by examiner

EMBEDDED ON-DIE LASER SOURCE AND OPTICAL INTERCONNECT

TECHNICAL FIELD

This disclosure relates generally to optical interconnects, and in particular but not exclusively, relates to embedding a laser source on a die and optically interconnecting the laser source with circuit components on the die.

BACKGROUND INFORMATION

As the power of processing devices exponentially increases, high bandwidth communication links interconnecting these processing devices are increasingly important. Optical media or carriers are capable of providing such high bandwidth communication links. An on-die optical interconnect system may include a detector, a modulator, and an optical waveguide all manufactured and embedded within a single semiconductor die. Often, the semiconductor die is a silicon die, which may include both optical and electrical circuit components integrated therein. However, laser sources for providing the optical energy utilized and manipulated by the integrated silicon optical components are often not fabricated of silicon and therefore not integrated onto the silicon die.

Typical external laser sources include gallium arsenide based laser sources, which are chemically not compatible for integration with silicon. As such, these laser sources are externally coupled to the silicon die containing the optical components. To achieve a reasonable optical coupling, the laser source must be carefully aligned with the on-die optical components. The low error tolerances for alignment make this external coupling incompatible with high volume manufacturing ("HVM").

One conventional technique used to couple an external laser source to on-die optical components is referred to as fiber pigtail coupling. Fiber pigtail coupling includes extra processing steps to etch a V-groove having a vertical termination that is optically transparent into the surface of the die. An optical fiber is subsequently placed into the V-groove with its end butt connected to the optically transparent vertical termination. The V-groove consumes a relative large amount of on-die real estate and the process of positioning the optical fiber into the V-groove does not lend itself well to HVM.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for embedding a laser source on a semiconductor substrate and an optical interconnect to couple the laser source to internal components of the semiconductor substrate are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
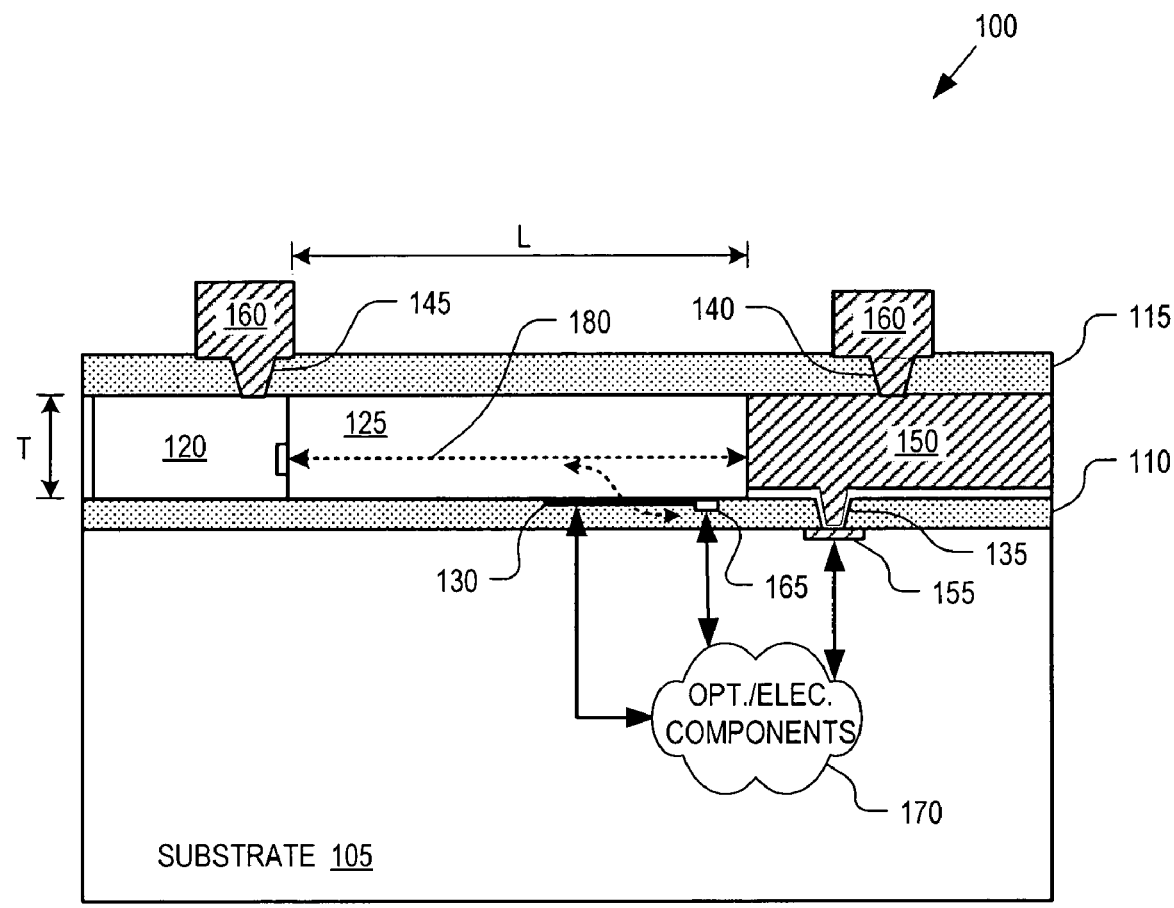
FIG. 1 is a cross-sectional view illustrating a laser source embedded on a semiconductor substrate and an optical interconnect to couple the laser source to internal components of the semiconductor substrate, in accordance with an embodiment of the invention.

FIG. 1 is a cross-sectional view illustrating an integrated circuit ("IC") 100 including a laser source embedded on a substrate and an optical interconnect to couple the laser source to internal components of the substrate, in accordance with an embodiment of the invention. The illustrated embodiment of IC 100 includes a substrate 105, a lower cladding/passivation layer 110, an upper cladding/passivation layer 115, a laser source 120, a package waveguide 125, an on-die waveguide 130, vias 135, 140, and 145, an electrical interconnect 150, an internal contact 155, external contacts 160, a photo detector 165, and integrated components 170.

The components of IC 100 are interconnected as follows. Laser source 120 is embedded within package waveguide 125 and positioned between lower and upper cladding/passivation layers 110 and 115. Package waveguide 125 is positioned to overlay on-die waveguide 130 that is disposed on lower cladding/passivation layer 110. When laser source 120 emits an optical signal 180 into package waveguide 125, optical signal 180 evanescently transfers optical energy into on-die waveguide 130. The separation distance and interaction length (i.e., overlapping length) between package waveguide 125 and on-die waveguide 130 may be selected to control the level of evanescent optical coupling between the two waveguides. The optical energy transferred into on-die waveguide 130 may then be coupled into a photo detector 165 for conversion to an electrical signal, or guided to other optical components 170 via an internal waveguide for direct optical manipulation within substrate 105. In essence, laser source 120 provides an on-die optical source for optical and/or optoelectronic components integrated within substrate 105 (e.g., components 170).

In the illustrated embodiment, laser source 120, package waveguide 125, and on-die waveguide 130 are disposed within the passivation layer typically coated onto a wafer or die to protect substrate 105 from corrosion, oxidization, or other chemical reactions. However, in IC 100, the passivation layers serve the dual purposes of both passivation and optical cladding. Any passivation material may be used in connection with the techniques described herein, as long as its index of refraction is lower than the material used to fabricate the core material of package waveguide 125. Lower cladding/passivation layer 110 may be made of silicon dioxide, or other wafer passivation materials. Upper cladding/passivation layer 115 may be made of polyimide, benzocyclobutene ("BCB"), silicone, acrylics, or other polymer based materials.

Package waveguide 125 and on-die waveguide 130 together form an optical interconnect that enables integrating a laser source fabricated of a material that is incompatible for direct internal integration with the material used to fabricate substrate 105. Disposing laser source 120 on lower cladding/passivation layer 110 and within package waveguide 125 chemically isolates the metals, alloys, or materials of laser source 120 from the metals, alloys, or materials of substrate 105. For example, in one embodiment, laser source 120 is a gallium-arsenide based laser (e.g., InP/lnGaAsP multi-quantum well edge emitting laser, etc.) while substrate 105 is a silicon semiconductor substrate. In other embodiments, laser source 120 may be formed of other III-V semiconductor materials or otherwise.

Since evanescent coupling is used to transfer optical power from package waveguide 125 to on-die waveguide 130, alignment tolerances are loosened, making IC 100 amenable to high-volume manufacturing ("HVM"). In one embodiment, package waveguide is fabricated of a polymer material (e.g., BCB or the like) having a rectangular cross-section with the following dimensions: a thickness T approximately equal to 10 to 20 µm, a width W approximately equal to 20 to 50 µm, and a length L approximately equal to 300 to 500 µm. Other cross-sectional shapes and materials may also be used to fabricate package waveguide 125. In an embodiment where both package waveguide 125 and upper cladding/passivation layer 115 are both formed of BCB, the chemical structure of the BCB material forming upper cladding/passivation layer 115 may be modified compared to the BCB material forming package waveguide 125 such that the index of refraction of upper cladding/passivation layer 115 is lower than package waveguide 125. On-die waveguide 130 may be fabricated of silicon nitride, silicon dioxide, silicon oxy-nitride, thin film silicon, titanium dioxide, or other optically transmissive materials having a higher index of refraction than lower cladding/passivation layer 110. On-die waveguide 130 may be a planar waveguide having a rectangular cross-section or assume other cross-sectional shapes.

In one embodiment, a retro-reflector (not illustrated) may cap off the distal end of package waveguide 125 opposite laser source 120 to form an external resonance cavity. In this embodiment, the external resonance cavity may enable the intensity of optical signal 125 to multiply to provide greater optical intensity to components 170. Furthermore, the length of the external cavity may enable selection of different resonance wavelengths for executing multi wavelength tasks (e.g., dense wavelength division multiplexing) by components 170 within substrate 105. Other embodiments need not include a retro-reflector, as illustrated.

External contacts 160 (e.g., solder bumps, contact pads, wire leads, etc.) may be formed on IC 100 to provide power to and transmit electrical signals to/from IC 100. Via 145 is coupled to one of external contacts 160 to provide power to laser source 120. Electrical interconnect 150 provides an electrical conduit between vias 135 and 140 for providing power to and/or transmitting signals to/from components 170 integrated within substrate 105. In one embodiment, internal contact 155, vias 135, 140, and 145, electrical interconnect 150 and external contacts 160 are fabricated of metal (e.g., copper, aluminum, gold, etc.).

Figure 2:
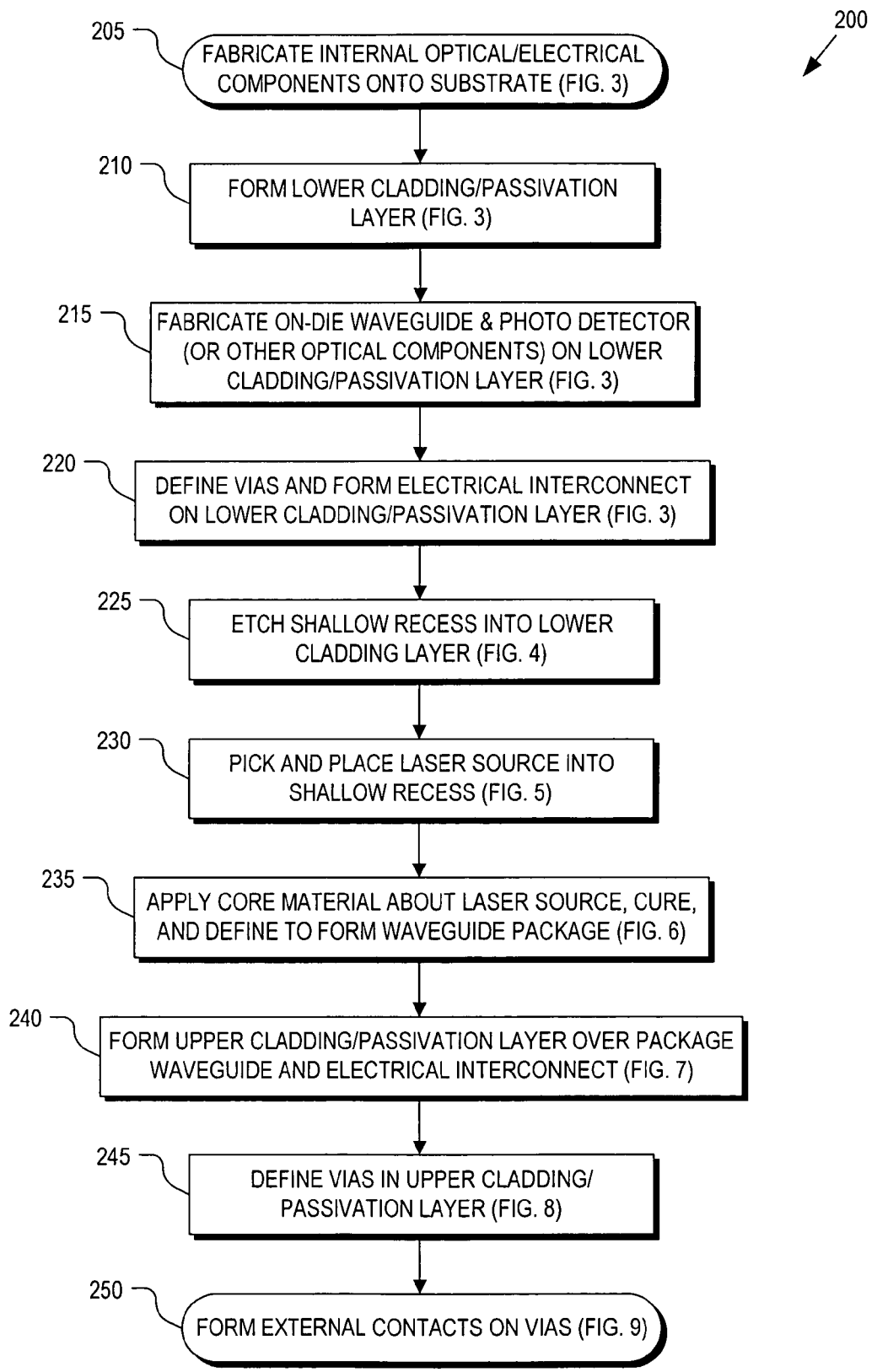
FIG. 2 is a flow chart illustrating a process for fabricating an integrated circuit having an embedded laser source thereon, in accordance with an embodiment of the invention.
Figure 3:
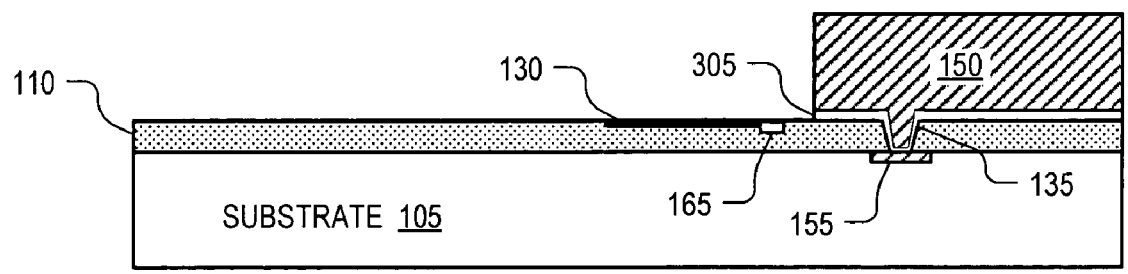
FIG. 3 is a cross-sectional view illustrating formation of an on-die waveguide on a lower passivation/cladding layer and formation of a via through the lower passivation/cladding layer, in accordance with an embodiment of the invention.
Figure 4:
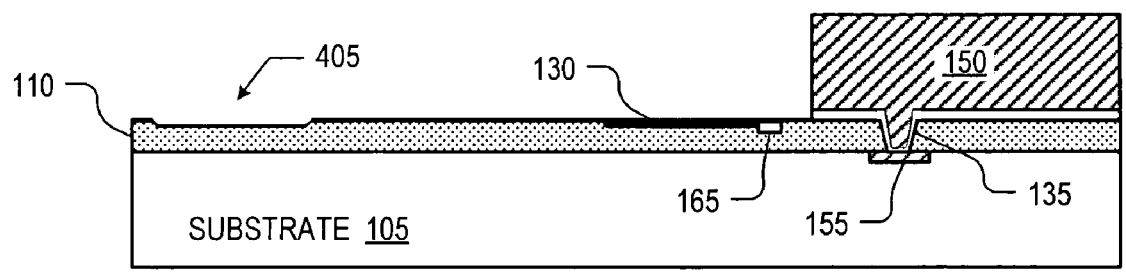
FIG. 4 is a cross-sectional view illustrating formation of a shallow recess within the lower passivation/cladding layer, in accordance with an embodiment of the invention.
Figure 5:
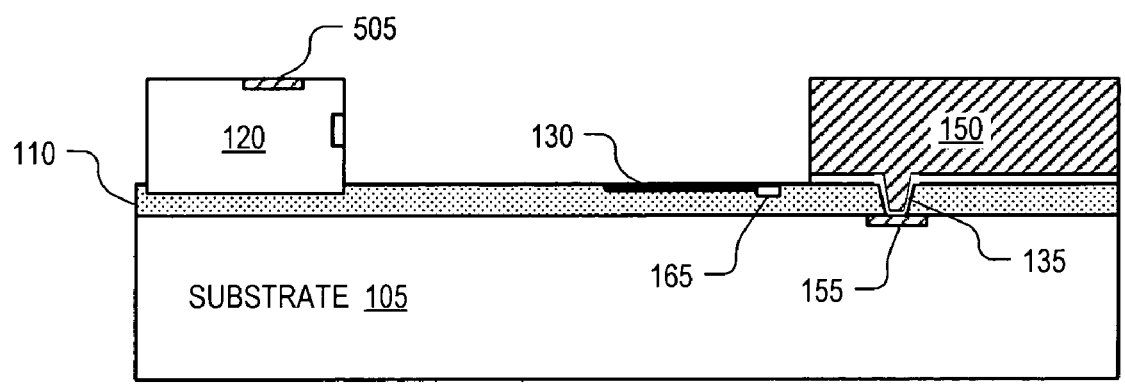
FIG. 5 is a cross-sectional view illustrating placement of a laser source within the shallow recess of the lower passivation/cladding layer, in accordance with an embodiment of the invention.
Figure 6:
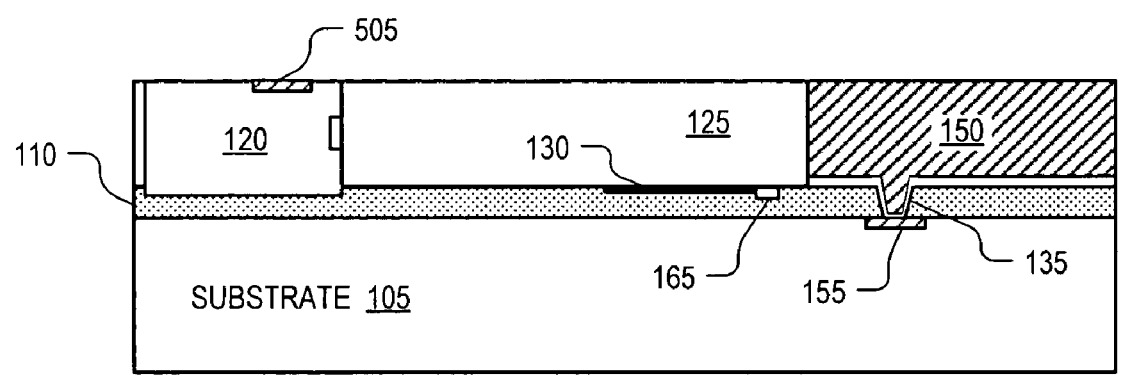
FIG. 6 is a cross-sectional view illustrating formation of a core material around the laser source and over the on-die waveguide and defining a package waveguide out of the core material, in accordance with an embodiment of the invention.
Figure 7:
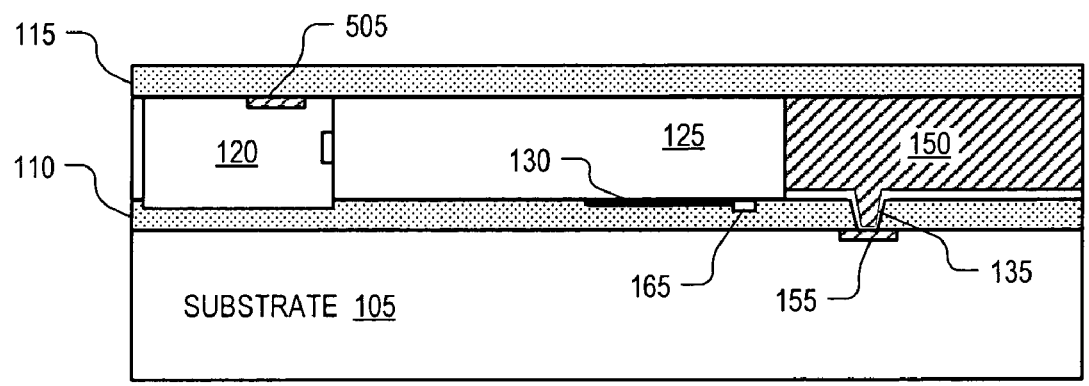
FIG. 7 is a cross-sectional view illustrating formation of an upper passivation/cladding layer over the package waveguide, in accordance with an embodiment of the invention.
Figure 8:
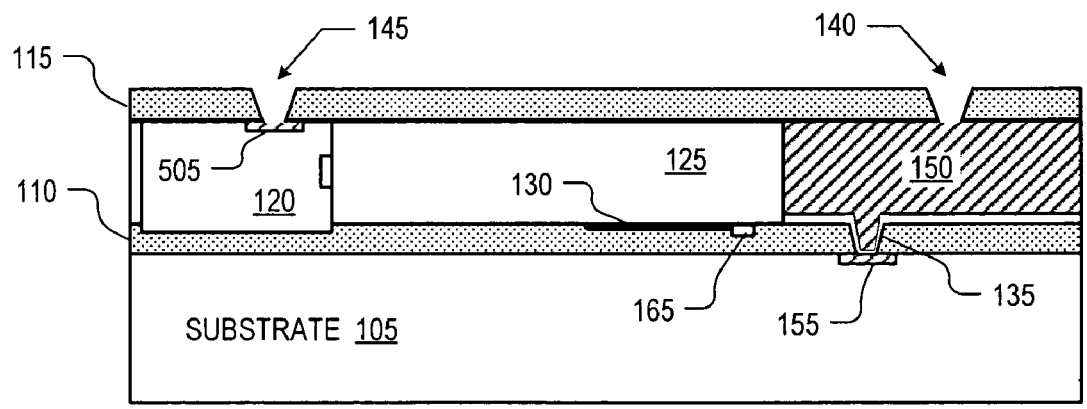
FIG. 8 is a cross-sectional view illustrating formation of vias through the upper passivation/cladding layer, in accordance with an embodiment of the invention.
Figure 9:
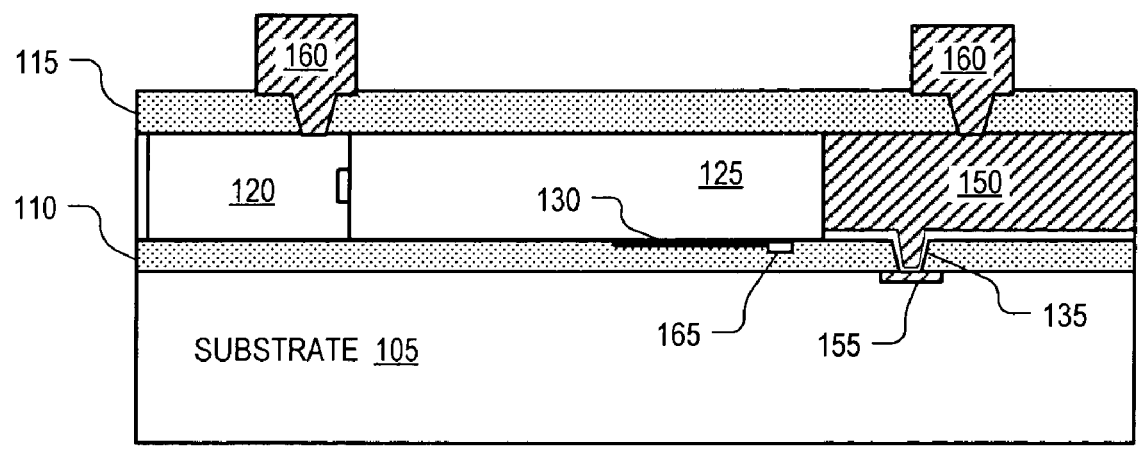
FIG. 9 is a cross-sectional view illustrating formation of electrical contacts within the vias of the upper passivation/cladding layer for external connections, in accordance with an embodiment of the invention.

FIG. 2 is a flow chart illustrating a process 200 for fabricating IC 100 having laser source 120 embedded thereon, in accordance with an embodiment of the invention. Process 200 is described with reference to FIGS. 3-9. The order in which some or all of the process blocks appear in process 200 should not be deemed limiting. Rather, one of ordinary skill in the art having the benefit of the present disclosure will understand that some of the process blocks may be executed in a variety of orders not illustrated.

In a process block 205 (FIG. 3), internal optical and/or electrical components 170 are fabricated into substrate 105. In an embodiment where substrate 105 is a silicon based semiconductor substrate 105, components 170 are fabricated/integrated into substrate 105 using known techniques for silicon IC fabrication. Components 170 may include transistors, capacitors, waveguides, optical splitters/combiners, modulators, photo detectors, and the like for manipulating both optical and electrical signals.

In a process block 210 (FIG. 3), lower cladding/passivation layer 110 is deposited over the exposed surface of substrate 105. Lower cladding/passivation layer 110 forms an inter-layer dielectric between lower layers of substrate 105 and the components of IC 100 formed above. In one embodiment, lower cladding/passivation layer 110 is deposited onto substrate 105 using chemical vapor deposition (CVD). In a process block 215 (FIG. 3), on-die waveguide 130, photo detector 165 and any other optical components are formed on lower cladding/passivation layer 110. Photodetector 165 is positioned to make optical contact with on-die waveguide 165 and receive optical signal 180 therefrom. In one embodiment, photodetector 165 is a silicon germanium photodetector.

On-die waveguide 130 may be formed on lower cladding/passivation layer 110 using plasma enhanced chemical vapor deposition ("PECVD"). In one embodiment, on-die waveguide 130 is approximately 0.5 µm thick, 1.0 µm wide (into page), and 10 µm long. A variety of optical materials having an index of refraction higher than lower cladding/ passivation layer 110 may be used to fabricate on-die waveguide 130, including any of silicon nitride ($Si_3N_4$), silicon oxy-nitride (SiOxNy), thin film silicon, titanium dioxide, and the like.

In a process block 220 (FIG. 3), via 135 is etched into lower cladding/passivation layer 110 using photolithography or other techniques. The empty via 135 is then backfilled with conductive material, such as, copper or other conductive contact metals. Electrical interconnect 150 may then be formed over the backfilled via 135. Electrical interconnect 150 interconnects one of external contacts 160 to internal contact 155 for coupling to internal components 170.

In a process block 225, (FIG. 4), shallow recess 405 is etched into lower cladding/passivation layer 110. Shallow recess 405 is etched to be form-fitted to laser source 120. In one embodiment, shallow recess 405 is approximately 1-5 μm deep.

In a process block 230 (FIG. 5), laser source 120 is picked and placed into shallow recess 405. Shallow recess 405 acts to passively align laser source 120 during the pick and place process and to provide lateral mechanical support so that laser source 120 does not shift or move during subsequent fabrication stages. In one embodiment, an adhesive may be applied to the bottom of laser source 120 (or within shallow recess 405) to bond laser source 120 to lower cladding/passivation layer 110. In one embodiment, the pick and place procedure may be an automated task performed by robotic arms and is therefore amenable to HVM.

In a process block 235 (FIG. 6), the core material of package waveguide 125 is applied to the surface of IC 100 about laser source 120. In one embodiment, the core material is mixed with a solvent to enable the core material to flow. A layer of the core material is then spin coated onto the top of IC 100. The core material may then be baked to remove the solvent and allow the core material to harden. Once hardened, the core material is patterned and the excess core material etched to define package waveguide 125. Then the core material is fully cured. The remaining core material forms package waveguide 125 having laser source 120 embedded therein and overlapping on-die waveguide 130. In one embodiment, the core material is a polymer based material, such as BCB.

In a process block 240 (FIG. 7), upper cladding/passivation layer 115 is formed over the surface of IC 100, including over the top of package waveguide 125. Upper cladding/passivation layer 115 is laid over package waveguide 125 to act as a cladding or beam confining layer, as well as, the topside of a passivation layer of IC 100. In one embodiment, upper cladding/passivation layer 115 is a polymer based material, such as BCB.

In a process block 245 (FIG. 8), vias 140 and 145 are formed on upper cladding/passivation layer 115. Via 145 is formed over a contact 505 on laser source 120 and via 140 is formed over electrical interconnect 150. Contact 505 may be a power contact for providing external power to laser source 120 to generate stimulated emission. In one embodiment, vias 140 and 145 are patterned and photo defined onto upper cladding/passivation layer 115.

In a process block 250 (FIG. 9), external contacts 160 are formed on and within vias 140 and 145 to provide external electrical contact to IC 100. Vias 140 and 145 may be solder bumps, C4 copper bumps, metal contacts or pads, wire leads, or the like. In one embodiment, a metal seed layer is sputtered over the surface of upper cladding/passivation layer 115. A photo resist layer is then spin coated over the seed layer and photo defined. Subsequently, vias 140 and 145 are filled in by plating vias 140 and 145 with metal (e.g., copper) to form external contacts 160. The remaining photo resist is stripped off and the blanket seed layer etched back to electrically isolate external contacts 160. Other techniques for filling vias 140 and 145 and forming external contacts 160 may be used.

Figure 10:
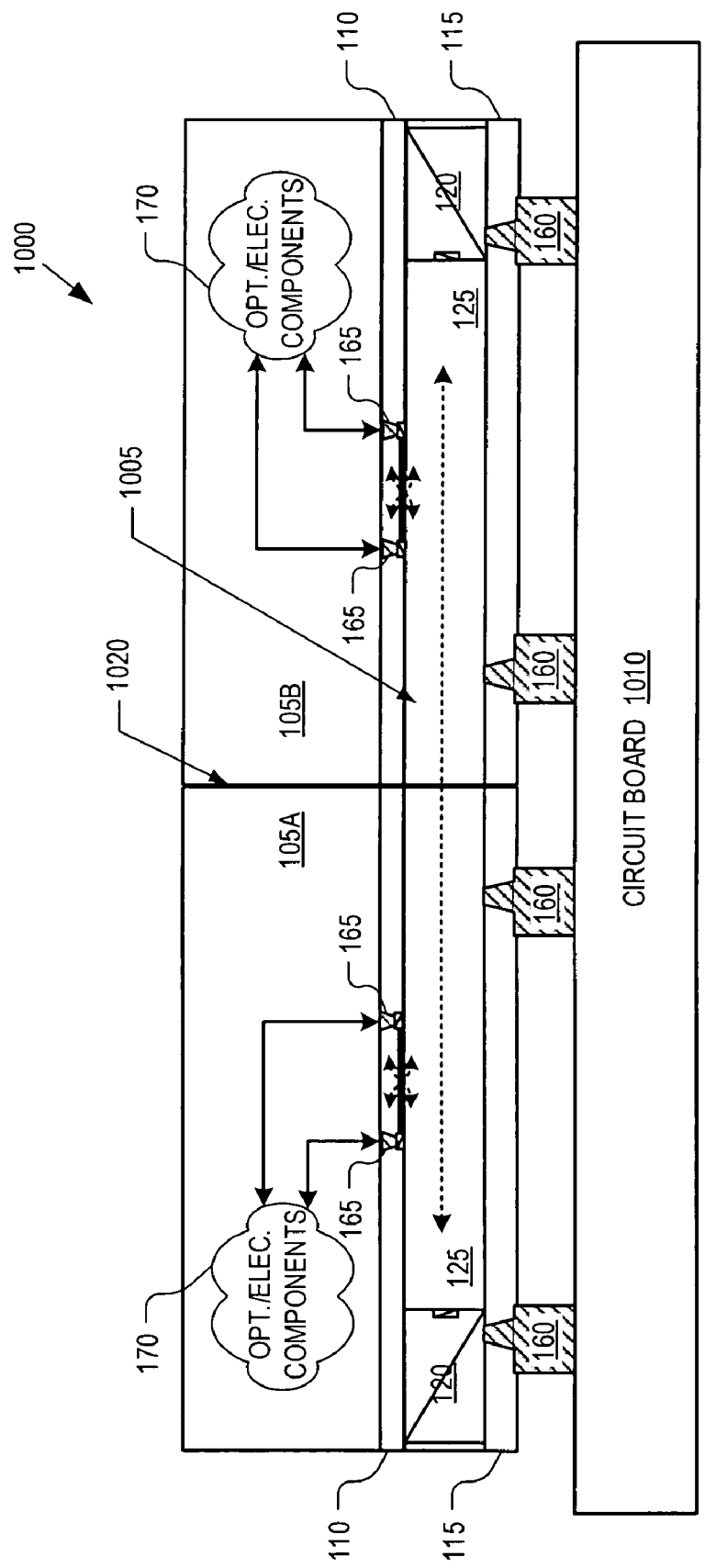
FIG. 10 is a cross-sectional view illustrating a processing system including an optical bus, in accordance with an embodiment of the invention.

FIG. 10 is a cross-sectional view illustrating a processing system 1000 including an optical bus 1005, in accordance with an embodiment of the invention. Optical bus 1005 acts as an optical interconnect between components 170 of substrates 105A and 105B. In one embodiment, substrates 105A and 105B may be physically distinct substrates that are mounted on a circuit board 1010 and have their respective package waveguides 125 butt coupled at interface 1020. In this embodiment, optical bus 1005 may act as a chip-to-chip optical interconnect.

FIG. 10 illustrates two optical sources 120, one associated with each substrate 105A and 105B to enable bidirectional signal propagation within optical bus 1005. Additionally, each substrate 105A and 105B may include multiple photo detectors 165 coupled on both sides of on-die waveguides 130 to evanescently pick up optical signals propagating in both directions. In other embodiments only a single photo detector 165 may be associated with each on-die waveguide 130 and only a single optical source 120 may generate optical signal 180 for propagation within optical bus 1005.

Alternatively, substrates 105A and 105B may represent a single substrate 105. In this embodiment, optical bus 1005 may operate as an on-die optical bus, as opposed to a chip-to-chip optical bus. For example, components 170 may each represent a processor core (or other processing entity) interconnected via optical bus 1005.

Figure 11:
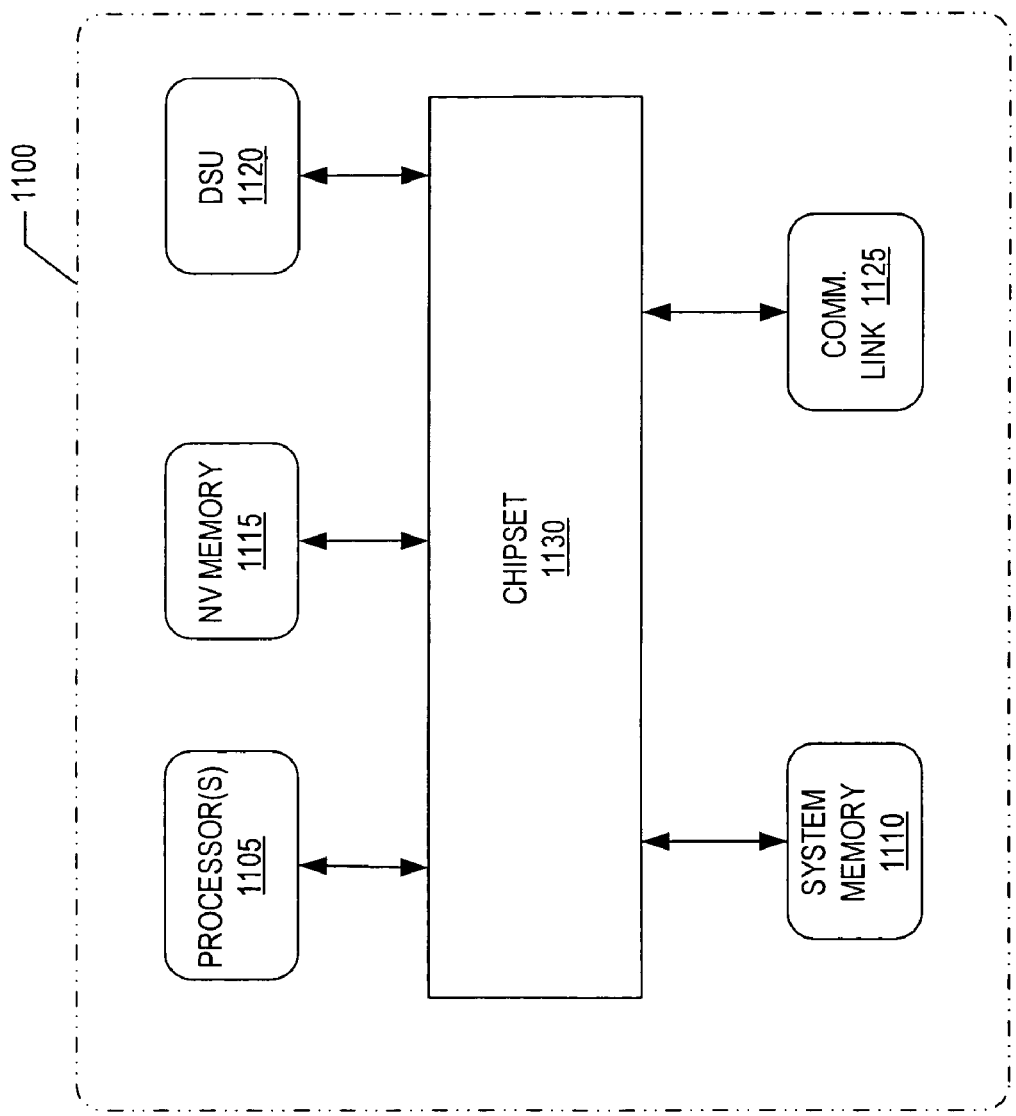
FIG. 11 is a block diagram illustrating a demonstrative system in which embodiments of the invention are implemented.

FIG. 11 is a block diagram illustrating a demonstrative processing system 1100 that may be implemented using the optical interconnect (package waveguide 125 and on-die waveguide 130) and embedded laser source 120 discussed above. The illustrated embodiment of processing system 1100 includes one or more processors (or central processing units) 1105, system memory 1110, nonvolatile ("NV") memory 1115, a DSU 1120, a communication link 1125, and a chipset 1130. Processor(s) 1105 may represent integrated circuit 100 illustrated in FIG. 1. The illustrated processing system 1100 may represent any computing system including a desktop computer, a notebook computer, a workstation, a handheld computer, a server, a blade server, or the like.

The elements of processing system 1100 are interconnected as follows. Processor(s) 1105 is communicatively coupled to system memory 1110, NV memory 1115, DSU 1120, and communication link 1125, via chipset 1130 to send and to receive instructions or data thereto/therefrom. In one embodiment, NV memory 1115 is a flash memory device. In other embodiments, NV memory 1115 includes any one of read only memory ("ROM"), programmable ROM, erasable programmable ROM, electrically erasable programmable ROM, or the like. In one embodiment, system memory 1110 includes random access memory ("RAM"), such as dynamic RAM ("DRAM"), synchronous DRAM, ("SDRAM"), double data rate SDRAM ("DDR SDRAM") static RAM ("SRAM"), and the like. DSU 1120 represents any storage device for software data, applications, and/or operating systems, but will most typically be a nonvolatile storage device. DSU 1120 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1120 is illustrated as internal to processing system 1100, DSU 1120 may be externally coupled to processing system 1100. Communication link 1125 may couple processing system 1100 to a network such that processing system 1100 may communicate over the network with one or more other computers. Communication link 1125 may include a modem, an Ethernet card, a Gigabit Ethernet card, Universal Serial Bus ("USB") port, a wireless network interface card, a fiber optic interface, or the like.

It should be appreciated that various other elements of processing system 1100 have been excluded from FIG. 11 and this discussion for the purposes of clarity. For example, processing system 1100 may further include a graphics card, additional DSUs, other persistent data storage devices (e.g., tape drive), and the like. Chipset 1130 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1130. Correspondingly, processing system 1100 may operate without one or more of the elements illustrated. For example, processing system 1100 need not include DSU 1120.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
a semiconductor substrate;
an on-die waveguide integrated on the semiconductor substrate;
a package waveguide disposed over the on-die waveguide and evanescently coupled to the on-die waveguide;
a laser source embedded within the package waveguide to provide an optical signal to the on-die waveguide via the package waveguide; and
a photo detecting device disposed within the semiconductor substrate and optically coupled to the on-die waveguide to receive the optical signal form the laser source.

2. The apparatus of claim 1, wherein the package waveguide is disposed within a passivation layer of the semiconductor substrate.

3. The apparatus of claim 2, wherein the on-die waveguide is disposed within the passivation layer of the semiconductor substrate and wherein the passivation layer acts as a cladding for the package waveguide and the on-die waveguide.

4. The apparatus of claim 3, wherein the passivation layer includes a lower passivation layer and an upper passivation layer and wherein on-die waveguide and the package waveguide are disposed between the lower and upper passivation layers.

5. The apparatus of claim 4, wherein the lower passivation layer comprises silicon dioxide and the upper passivation layer comprises a polymer material having a lower index of refraction than the package waveguide.

6. The apparatus of claim 2, wherein the laser source is fabricated of a first semiconductor material non-integratable with a second semiconductor material of the semiconductor substrate.

7. The apparatus of claim 2, wherein the semiconductor laser source comprises a III-V semiconductor material and the semiconductor substrate comprises a silicon substrate.

8. The apparatus of claim 2, wherein the package waveguide comprises a polymer material.

9. The apparatus of claim 1, further comprising:
a plurality of on-die waveguides integrated on the semiconductor substrate;
a plurality of photo detectors disposed on the semiconductor substrate and each optically coupled to one of the plurality of on-die waveguides to receive the optical signal from the laser source, wherein the package waveguide is an optical bus; and
electronic components integrated on the semiconductor substrate, the electronic components electrically coupled to the plurality of photo detectors.

10. The apparatus of claim 1, further comprising optical components integrated on the semiconductor substrate, the optical components optically coupled to the on-die waveguide to receive the optical signal and to optically manipulate the optical signal.

11. The apparatus of claim 1, wherein the semiconductor substrate comprises a first semiconductor substrate, the on-die waveguide comprises a first on-die waveguide, the package waveguide comprises a first package waveguide, and the laser source comprises a first laser source, and further comprising:
a second semiconductor substrate;
a second on-die waveguide integrated on the second semiconductor substrate; and
a second package waveguide disposed on the second semiconductor substrate and evanescently coupled to the second on-die waveguide, the second package waveguide optically coupled to the first package waveguide to provide an optical interconnection between the first and second semiconductor substrates.

12. A method of manufacturing an optical interconnect, comprising:
forming a first cladding layer on a semiconductor substrate;
forming an on-die waveguide on the first cladding layer;
placing a laser source on the first cladding layer;
disposing a core material about the laser source and over the on-die waveguide; and
defining a package waveguide out of the core material, the package waveguide positioned to evanescently couple an optical signal from the laser source to the on-die waveguide.

13. The method of claim 12, further comprising forming a second cladding layer over the package waveguide.

14. The method of claim 13, wherein the first and second cladding layers comprise an upper passivation layer of the semiconductor substrate.

15. The method of claim 14, further comprising:
disposing a first electrical contact within the semiconductor substrate coupling to an electrical component within the semiconductor substrate;
defining a via within the first cladding layer above the first electrical contact;
disposing an electrical interconnect within the via.

16. The method of claim 12, further comprising forming a recess within the first cladding layer prior to placing the laser source and disposing the core material, and wherein placing the laser source on the first cladding layer comprises picking and placing the laser source into the recess of the first cladding layer.

17. The method of claim 12, wherein the laser source comprises a gallium-arsenide based laser source and the semiconductor substrate comprises a silicon based substrate.

18. A processing system, comprising:
   first and second processor cores integrated into a semiconductor substrate;
   synchronous dynamic random access memory ("SDRAM") coupled to the first processor core; and
   an optical bus interconnecting the first and second processor cores, the optical bus including:
      on-die waveguides integrated on the semiconductor substrate, each on-die waveguide associated with one of the first and second processor cores;
      a package waveguide disposed on the semiconductor substrate and evanescently coupled to the on-die waveguides; and
      a laser source embedded within the package waveguide to provide an optical signal to the on-die waveguides via the package waveguide.

19. The processing system of claim 18, wherein the package waveguide is disposed within a passivation layer of the semiconductor substrate.

20. The processing system of claim 19, wherein the on-die waveguide is disposed within the passivation layer of the semiconductor substrate and wherein the passivation layer acts as a cladding for the package waveguide and the on-die waveguide.

21. The processing system of claim 20, wherein the semiconductor laser source includes a III-V semiconductor material and the semiconductor substrate comprises a silicon semiconductor substrate.

* * * * *